US009680229B2

(12) United States Patent
Macfarlane et al.

(10) Patent No.: US 9,680,229 B2
(45) Date of Patent: Jun. 13, 2017

(54) MODULAR REFLECTOR ASSEMBLY FOR A REFLECTOR ANTENNA

(71) Applicant: The Boeing Company, Chicago, IL (US)

(72) Inventors: Jerry Douglas Macfarlane, Rancho Palos Verdes, CA (US); Joel Mendoza, Sylmar, CA (US); Ray Amoranto, Fullerton, CA (US); Brian E. Park, Gardena, CA (US); Nicholas James Smith, El Segundo, CA (US); Mark E. Ankrom, La Palma, CA (US); Jeffrey Wallace, Los Angeles, CA (US); David B. Robinson, Portal, AZ (US)

(73) Assignee: The Boeing Company, Chicago, IL (US)

( * ) Notice: Subject to any disclaimer, the term of this patent is extended or adjusted under 35 U.S.C. 154(b) by 255 days.

(21) Appl. No.: 13/931,105

(22) Filed: Jun. 28, 2013

(65) Prior Publication Data

US 2015/0002368 A1 Jan. 1, 2015

(51) Int. Cl.
| | |
|---|---|
| *H01Q 15/14* | (2006.01) |
| *H01Q 1/00* | (2006.01) |
| *H01Q 1/12* | (2006.01) |
| *H01Q 1/28* | (2006.01) |
| *H01Q 15/16* | (2006.01) |
| *F16B 5/01* | (2006.01) |

(52) U.S. Cl.
CPC ............. *H01Q 15/14* (2013.01); *H01Q 1/002* (2013.01); *H01Q 1/1207* (2013.01); *H01Q 1/288* (2013.01); *H01Q 15/141* (2013.01); *H01Q 15/144* (2013.01); *H01Q 15/16* (2013.01); *F16B 5/01* (2013.01); *Y10T 29/49826* (2015.01)

(58) Field of Classification Search
CPC ........................................................ H01Q 15/14
USPC ........................................................ 343/912
See application file for complete search history.

(56) References Cited

U.S. PATENT DOCUMENTS

| | | | | | |
|---|---|---|---|---|---|
| 4,484,189 | A | * | 11/1984 | Dettmer | G09G 5/42 340/974 |
| 4,484,198 | A | * | 11/1984 | Georgel | H01Q 15/16 343/880 |
| 4,550,319 | A | * | 10/1985 | Ganssle | H01Q 1/18 343/882 |
| 4,635,071 | A | * | 1/1987 | Gounder | H01Q 15/142 343/897 |
| 5,178,709 | A | | 1/1993 | Shimodaira | |
| 5,686,930 | A | | 11/1997 | Brydon | |

(Continued)

FOREIGN PATENT DOCUMENTS

EP        1024301 A2      8/2000

OTHER PUBLICATIONS

European Patent Office, European Application No. 14171281.0, European Search Report dated Nov. 17, 2014, 11 pages.

*Primary Examiner* — Dameon E Levi
*Assistant Examiner* — Walter Davis
(74) *Attorney, Agent, or Firm* — Charles L. Moore; Moore & Van Allen PLLC

(57) ABSTRACT

An modular reflector assembly may include a shell and a support frame. The modular reflector assembly may also include a plurality of support links that mechanically couple the shell to the support frame. The shell may be thermally decoupled from the support frame by the plurality of support links.

23 Claims, 5 Drawing Sheets

(56) References Cited

U.S. PATENT DOCUMENTS 6,140,978 A * 10/2000 Patenaude ............ H01Q 1/288
343/756
2012/0026056 A1 2/2012 Desagulier

* cited by examiner

MODULAR REFLECTOR ASSEMBLY FOR A REFLECTOR ANTENNA

FIELD

The present disclosure relates to antennas, and more particularly to a modular reflector for a reflector antenna.

BACKGROUND

One challenge with conventional reflectors is that a reflective surface (the "shell") and backing structure are coupled to one another at hundreds of bonded joints such that the stiff backing structure distorts the relatively flexible reflective surface of the shell at on-orbit temperature extremes. Because satellite antenna coverages are each unique, from antenna to antenna, the conventional reflector reflective surfaces may be shaped differently. The conventional reflector integral background structure ribs must be custom-machined to match each different shell shape. This makes the design and construction of the conventional reflector or antenna assembly complex and time-consuming.

SUMMARY

In accordance with an embodiment, a modular reflector assembly may include a shell and a support frame. The modular reflector assembly may also include a plurality of support links that mechanically couple the shell to the support frame. The shell may be thermally decoupled from the support frame by the plurality of support links.

In accordance with another embodiment, a modular reflector assembly may include a shell for reflecting radio frequency signals. The shell may include a thermally stable structure that substantially maintains its shape during temperature changes. The modular reflector assembly may also include a support frame and a plurality of support links that mechanically couple the shell to the support frame. The shell may be thermally decoupled from the support frame by the plurality of support links and the support links provide a gap between the shell and the support frame.

In accordance with further embodiment, a method for making a modular reflector assembly may include forming a shell including a particular shape based on a desired radiation pattern of the modular reflector assembly. The method may also include forming a support frame. The support frame may be a same shape regardless of the particular shape of the shell. The method may further include mechanically coupling the shell to the support frame by a plurality of support links. The shell may be thermally decoupled from the support frame by the plurality of support links.

BRIEF DESCRIPTION OF THE SEVERAL VIEWS OF DRAWINGS

The following detailed description of embodiments refers to the accompanying drawings, which illustrate specific embodiments of the disclosure. Other embodiments having different structures and operations do not depart from the scope of the present disclosure.

DESCRIPTION

Figure 1:
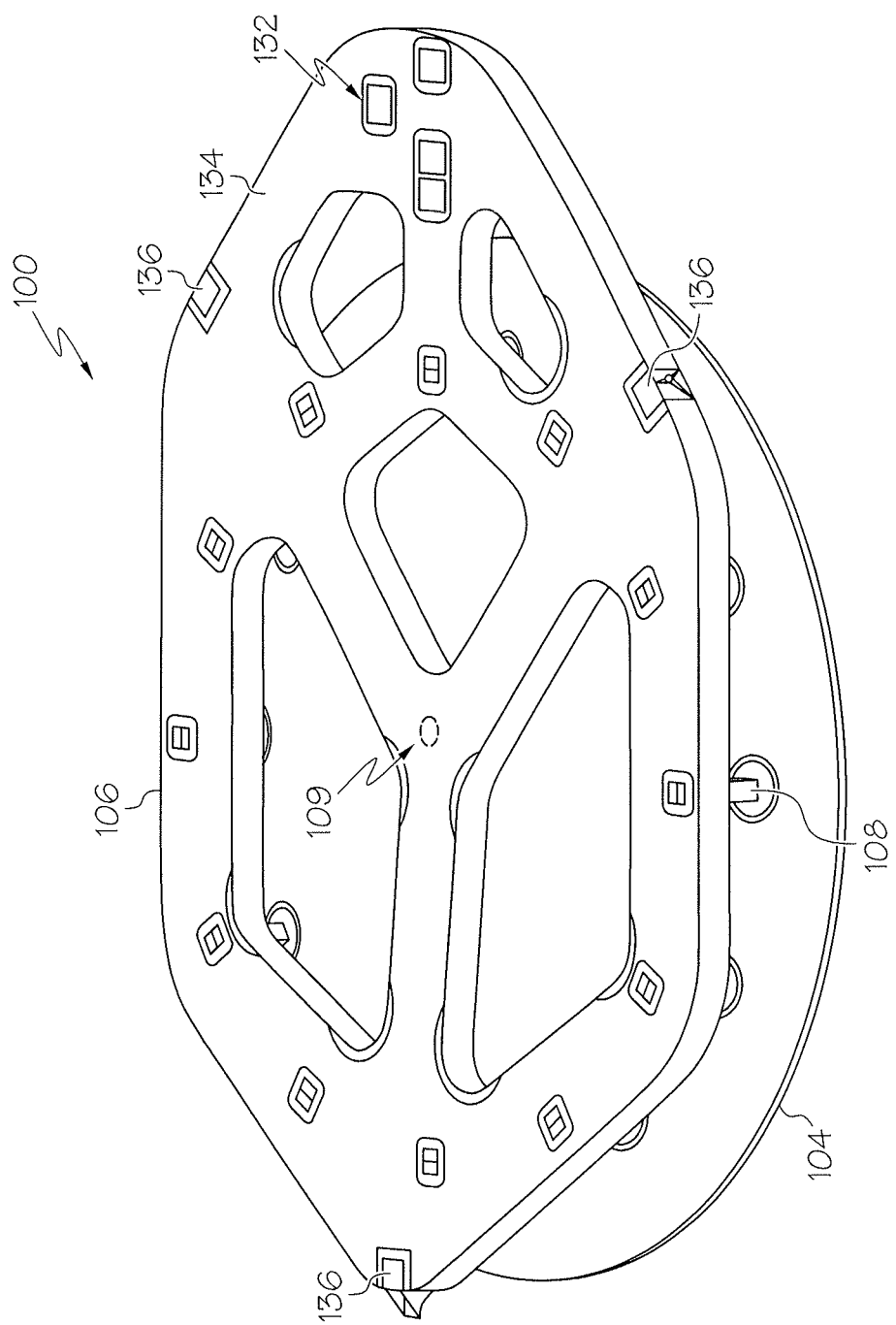
FIG. 1 is a perspective view of an example of a modular reflector assembly in accordance with an embodiment of the present disclosure.

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

FIG. 1 is a perspective view of an example of a modular reflector assembly 100 in accordance with an embodiment of the present disclosure. The modular reflector assembly 100 may be part of a reflector antenna that may be mounted on a satellite similar to the satellite 300 described with reference to FIG. 3. The modular reflector assembly 100 may include a shell 104 and a support frame 106 that supports the shell 104. The modular reflector assembly 100 may also include a plurality of support links 108 that couple the shell 104 to the support frame 106. Each support link 108 may be formed from a composite material. Accordingly, the shell 104 is thermally decoupled from the support frame 106 by the plurality of support links 108. The support links 108 may be positioned about a perimeter of the shell 104 proximate to an edge of the perimeter of the shell 104. The support links 108 may be flexible in radial directions from a center point 109 of the shell 104 or reflector. The support links 108 may also be referred to as flexures or radial-release flexures. In the embodiment illustrated in FIG. 1, there are twelve (12) support links 108 that are evenly distributed around the perimeter of the shell 104. The support links 108 are designed to have substantially identical radial stiffness relative to the center point 109 of the shell 104. The support links 108 are positioned so that the radial lines of action of the support links 108 or flexures intersect at the center point 109 of the shell 104 or reflector. During the launch vibration environment of a satellite carrying the modular reflector 100, each support link 108 only carries the launch loads including axial force, circumferential (shear) force, and radial moment. All other forces are zero. On orbit, during temperature swings, the support links 108 flex such that the support frame 106 does not distort the shell 104. The support links 108 have a sufficient strength and stiffness in three degrees-of-freedom to carry the launch loads and essentially zero stiffness in the other three degrees-of-freedom to allow decoupling of the support frame 106 from the shell 104 so that the support frame 106 may expand and contract or distort due to temperature swings or changes without causing distortion of the shell 104 which can adversely impact or distort the signal or radiation pattern of the shell 104. On-orbit temperature swings can range from about plus or minus 300 degrees Fahrenheit.

Figure 2:
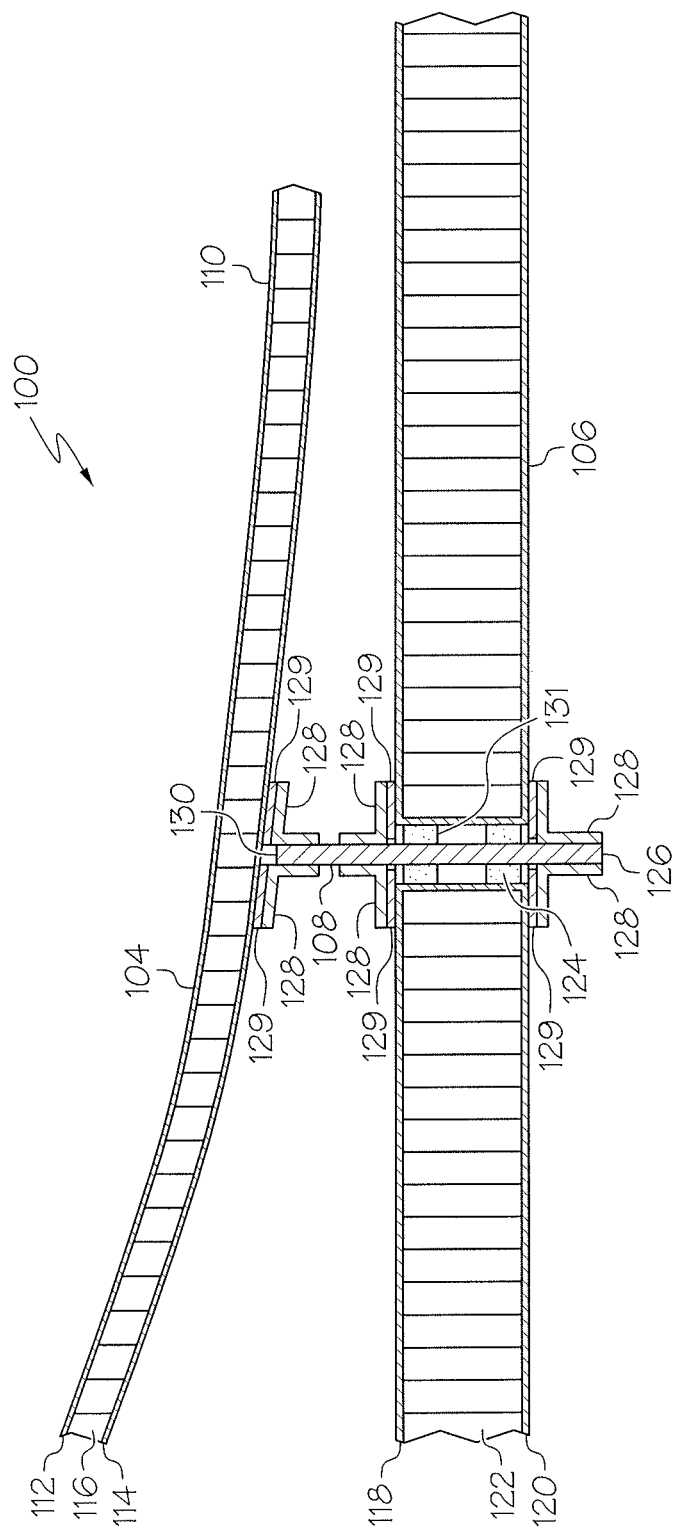
FIG. 2 is a detailed cross-sectional view of a portion of the modular reflector assembly of FIG. 1.

Referring also to FIG. 2, FIG. 2 is a detailed cross-sectional view of a portion of the modular reflector assembly 100 of FIG. 1. The shell 104 has a structure 110 that may reflect received or transmitted radio frequency (RF) signals and is thermally stable so that the shell 104 substantially maintains its shape or has minimal distortion due to on-orbit temperature changes or swings. A front face sheet 112 and a rear face sheet 114 of the shell 104 may be structurally and thermally isotropic allowing the shell 104 to be thermally stable. The structure 110 of the shell 104 may have an extremely low coefficient of thermal expansion (CTE), for example, below about 0.2 parts per million per degree Fahrenheit. By being structurally stable and by having a low CTE and being decoupled from the support frame 106, the shell 104 substantially maintains its shape and may have less than about 0.003 inches root mean square (RMS) change in shape or distortion resulting from temperature changes, such as daily on-orbit temperature swings that may be experienced by a satellite in orbit. Because the shell 104 is thermally stable and decoupled from the support frame 106 by the plurality of support links 108, the shell 104 substantially maintains its shape and radio frequency pattern distortion caused by temperature changes or on-orbit temperature swings are substantially minimized or small enough that there is no impact to the signal power. The support links 108 provide a gap "G" between the shell 104 and the support frame 106 that further thermally decouples the shell 104 from the support frame 106.

As previously discussed, the shell 104 may include a front face sheet 112 and a rear sheet 114. A honeycomb panel 116 or similar structure may be disposed between the front face sheet 112 and the rear face sheet 114 to define a honeycomb sandwich structure. The front face sheet 112 may be a reflective surface. The front face sheet 112 and the rear face sheet 114 may each include one or more plies of composite material or carbon fiber material. For example, each face sheet 112 and 114 may include two plies of carbon fiber material at about 0.0047 inches (4.7 mils) per ply. The honeycomb panel 116 may include a flame-resistant meta-aramid material, such as NOMEX® or other materials with flame-resistant properties. For example, the honeycomb panel 116 may be about 0.500 inches thick with 1.8 pounds per cubic (PCF) NOMEX® honeycomb core. The honey comb panel 116 of the shell 104 at the location of each support link 108 may be about 0.500 inches thick with a 6.0 PCF NOMEX® honeycomb core. The 6.0 PCF NOMEX® honeycomb core may have a predetermined radius about the attachment location of the support link 108 depending on the cross-sectional size of the support link 108. For example, for about a 2 inches square or diameter support link 108, the radius of the 6.0 PCF NOMEX® honeycomb core may be about 2.25 inches radius about the support link 108. The face sheets 112 and 114 may be bonded to opposite sides of the honeycomb panel 116 by a suitable adhesive, such as epoxy or similar adhesive. NOMEX® is a trademark of E.I. du Pont de Nemours and Company in the United States, other countries or both. Other flame-resistant materials may be used to perform the functions described herein and other materials having varying thicknesses and PCFs than those described herein may also be used.

The support frame 106 may include a first face sheet 118 and a second face sheet 120. A honeycomb core 122 or other core material may be disposed between the first face sheet 118 and the second face sheet 120 to define another honeycomb sandwich structure. The support frame 106 is adapted to have a robust structure that can carry launch loads or withstand the extreme forces and stresses of a rocket launch when the modular reflector assembly 100 is launched into orbit. The first face sheet 118 and the second face sheet 120 may each include one or more plies of composite material or carbon fiber material. For example, each face sheet 118 and 120 may include six plies of about 2.5 mils per ply of carbon fiber material that may be bonded together by a suitable adhesive, such as epoxy or other suitable adhesive. The honeycomb core 122 may be an aluminum honeycomb core. For example, the honeycomb core 122 may be about 3.5 inches thick 1.6 PCF aluminum honeycomb core. The face sheets 118 and 120 may be bonded to opposite sides of the honeycomb core 122 by a suitable adhesive, such as epoxy or other suitable adhesive.

Each support link 108 or flexure may be formed from a multiplicity of plies of carbon fiber material that may be bonded together by epoxy or other suitable bonding agent or adhesive to form an isotropic laminate structure. For example, each support link 108 may be about 48 mils by about two inches square or diameter laminate of carbon fiber material.

An opening 124 may be formed through the support frame 106 for each support link 108. A first end 126 of each support link 108 may extend through a respective opening 124 in the support frame 106. Each support link 108 may be attached to the support frame 106 on opposite sides of the support frame 106 as illustrated in FIG. 2. In another embodiment, the support link 108 may be attached to only one side of the support frame 106. The support link 108 may be attached to the support frame 106 by any mechanical fastener or other suitable attachment mechanism that can withstand the launch environment and the on-orbit temperature changes or swings. For example, the support link 108 may be attached to the support frame 106 by a plurality of angle clips 128 as illustrated in FIG. 2. The angle clips 128 may be bonded to the support link 108 and the support frame 106 by any suitable arrangement 129, such as by an epoxy or other high-strength adhesive or bonding material. A second end 130 of each support link 108 may be attached to the shell 104 by any mechanical fastener or other attachment mechanism that can withstand the launch environment and the on-orbit temperature changes or swings. In the exemplary embodiment in FIG. 2, the second end 130 of each support link 108 may be attached to the shell 104 by a plurality of angle clips 128. The angle clips 128 may be bonded to the support link 108 and the shell 104 by any suitable arrangement 129, such as by an epoxy or other high-strength adhesive or bonding material.

An edge fill material 131 may be inserted into the opening 124 between the support link 108 and interior wall of the opening 124. The edge fill material 131 may be low CTE foam.

Figure 3:
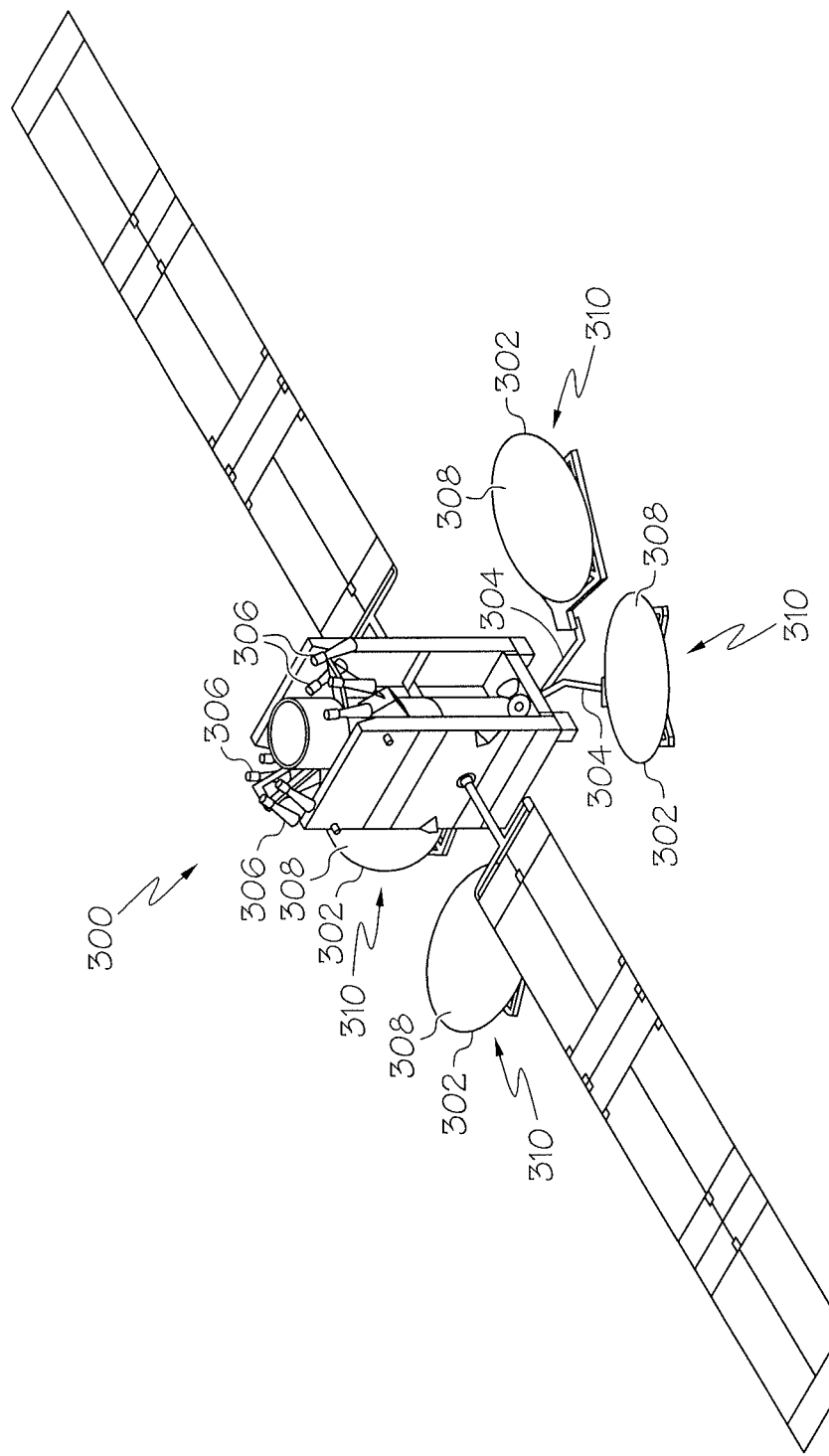
FIG. 3 is a perspective view of an example of a satellite including a deployed array of modular reflector assemblies in accordance with an embodiment of the present disclosure.

As best shown in FIG. 1, an extended range reflector positioning mechanism (XRPM) interface 132 may be attached to a face 134 of the support frame 106 opposite the shell 104. Referring also to FIG. 3, FIG. 3 is a perspective view of an example of a satellite 300 including an array of modular reflector assemblies 302 in accordance with an embodiment of the present disclosure. Each modular reflector assembly 302 may be the same as the modular reflector assembly 100 described with reference to FIGS. 1 and 2. Each modular reflector assembly 302 is illustrated in a deployed position, deployed by a reflector antenna deployment actuator (RADA) 304.

One or more radiation elements or feed horns 306 may be associated with each modular reflector assembly 302. The feed horn 306 may transmit and receive RF signals that are reflected by a front face sheet 308 or reflector of the modular reflector 302. The feed horn 306, modular reflector assembly 302 including front face sheet reflector 308 define a reflector antenna 310.

Figure 4:
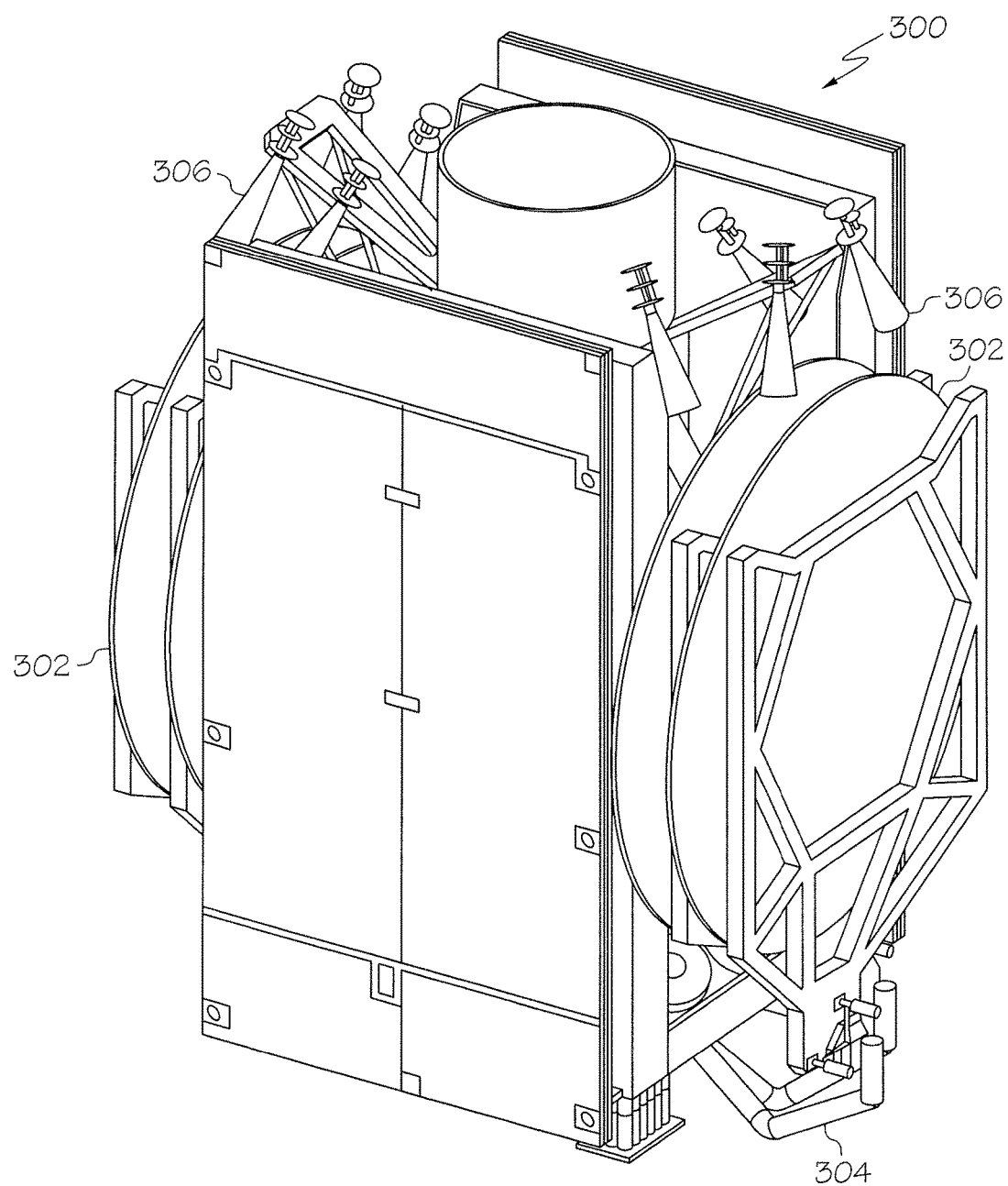
FIG. 4 is a perspective view of an example of the satellite of FIG. 3 showing the array of modular reflector assemblies folded for packaging in a launch vehicle in accordance with an embodiment of the present disclosure.

Referring back to FIG. 1, a launch lock interface 136 or plurality of launch lock interfaces 136 may also be attached on the face 134 of the support frame 106 opposite the shell 104. The launch lock interface 134 may be used to hold the modular reflector assemblies 302 (FIG. 3) in a folded position as illustrated in FIG. 4 when the satellite 300 is loaded on a spacecraft or launch vehicle for launching the satellite 300 into orbit. FIG. 4 is a perspective view of an example of the satellite 300 of FIG. 3 showing the array of modular reflector assemblies 302 folded for packaging on a launch vehicle in accordance with an embodiment of the present disclosure.

The shell 104 (FIG. 1) may include a particular shape based on a desired radiation pattern of the modular reflector assembly 100. The support frame 106 may be the same or may have the same shape independent of the particular shape of the shell 104 for different modular reflector assemblies. Accordingly, the assembly 100 may be referred to as a modular reflector assembly 100 because all components, including the support frame 106, of the modular reflector assembly 100 may be identical except the shell 104 which may have a different shape from one modular reflector to another based on the desired RF radiation pattern of the antenna. The modular reflector assembly 100 significantly reduces the parts complexity and reduces the cost and time to design, fabricate and test the modular reflector assembly 100. Additionally, because of the modular design of the reflector assembly 100, it may be designed to operate on most launch vehicles and satellite product lines. Therefore, satellite test plans can be the same from one modular reflector assembly 100 to another. During assembly, the shell 104 may be shape-tuned for RF performance optimization with the aid of any commercially available digital photogrammetry camera. Before attaching the links 108 to the frame 106, the shell 104 may be successively pushed or pulled by the links 108 and successively measured by the photogrammetry camera until the shape is optimized for RF performance.

Figure 5:
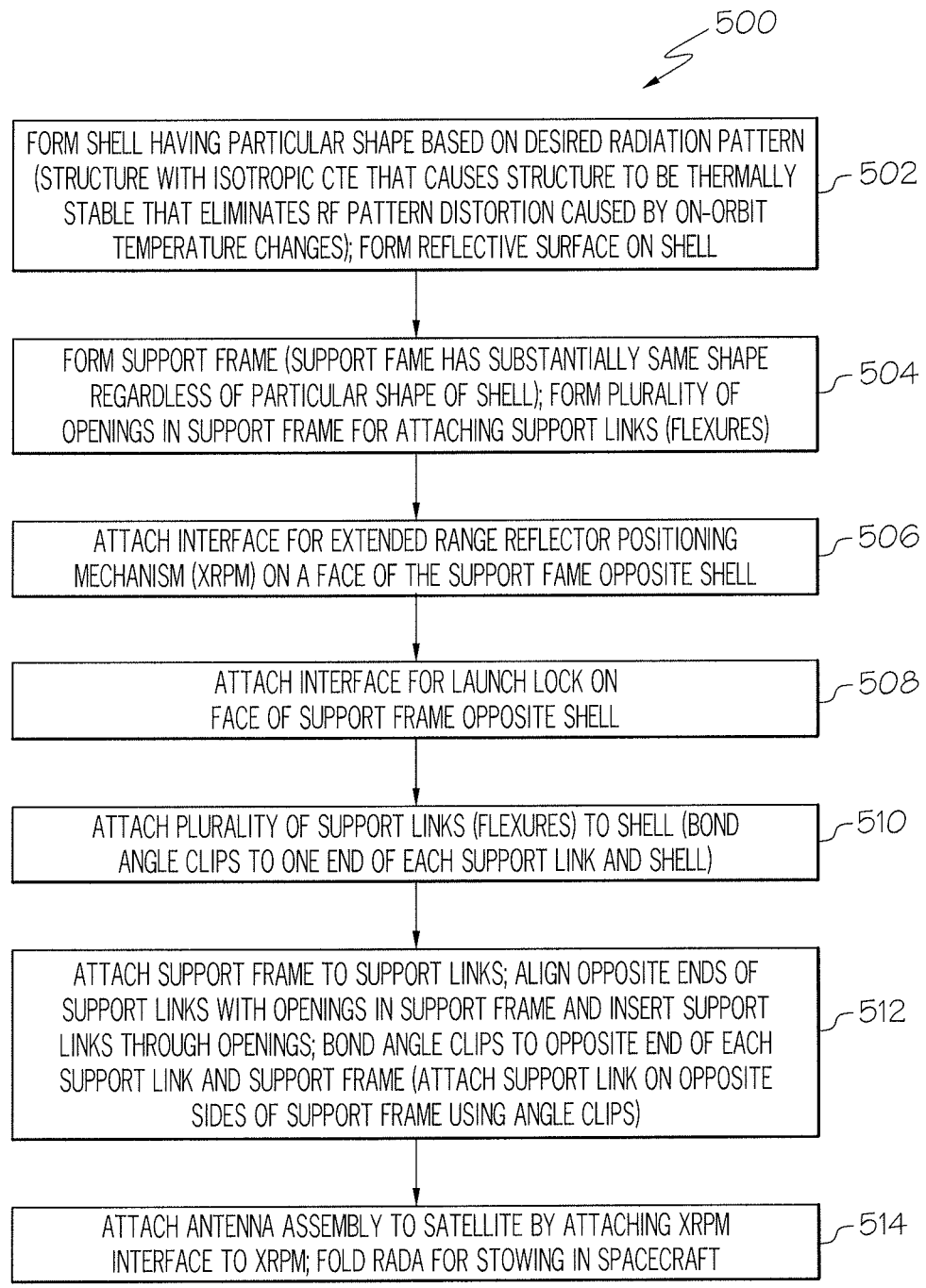
FIG. 5 is a flow chart of an example of a method for fabricating the modular reflector assembly in accordance with an embodiment of the present disclosure.

FIG. 5 is a flow chart of an example of a method 500 for fabricating a modular reflector assembly in accordance with an embodiment of the present disclosure. The method 500 may be used to make the modular reflector assembly 100 in FIGS. 1 and 2. In block 502, a shell may be formed having a particular shape based on a desired radiation pattern. Similar to that previously described the shell may include a structure with an isotropic coefficient of thermal expansion that causes the structure to be thermally stable. By being thermally stable, the shell does not distort or change its shape or dimensions with changes in temperature. Accordingly, RF pattern distortion caused by on-orbit temperature changes may be prevented by the shell having a structure that is thermally stable. A reflective surface is also disposed on the shell for reflecting RF signals.

In block 504, a support frame may be formed. The support frame may have substantially the same shape regardless of the particular shape of the shell. Accordingly, only the shell lay-up mandrel may change from one modular reflector assembly to another. A plurality of openings may be formed in the support frame for receiving respective support links or flexures for attaching the support links to the support frame similar to that described herein.

In block 506, an interface for an extended range reflector positioning mechanism (XRPM) may be attached on a face of the support frame which will be opposite the shell when the shell is attached to the modular reflector assembly.

In block 508, one or more interfaces for a launch lock or launch locks may be attached on the face of the support frame which will be opposite the shell when attached.

In block 510, a plurality of support links or flexures may be attached to the shell. Similar to that previously described, each of the support links may be attached to the shell by a plurality of angle clips which are respectively bonded to one end of each support link and the shell.

In block 512, the support frame may be attached to the support links. Opposite ends of the support links from the shell may be aligned with the openings in the support frame and the ends of the support links may be inserted through the openings. Angle clips may be respectively bonded to the support links and the support frame. The support links may be attached to each of the opposite sides of the support frame using angle clips similar to that described with reference to FIG. 2.

In block 514, the modular reflector assembly may be attached to a satellite by attaching an XRPM of the satellite to the XRPM interface on the support frame. An antenna deployment actuator (RADA) is coupled to the XRPM for deploying the modular reflector. The RADA may be folded similar to that shown in FIG. 5 for stowing the modular reflector assembly in a spacecraft for launching the satellite into orbit.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the embodiments herein have other applications in other environments. This application is intended to cover any adaptations or variations of the present disclosure. The following claims are in no way intended to limit the scope of the disclosure to the specific embodiments described herein.

What is claimed is:

1. A modular reflector assembly, comprising:
   a substantially circular shaped shell;
   a support frame; and
   a plurality of support links that mechanically couple the shell to the support frame, wherein the shell is thermally decoupled from the support frame by the plurality of support links and the support links provide a gap between the shell and the support frame, and wherein the shell comprises a reflective surface that reflects radio frequency signals, the reflective surface being opposite another surface that faces the support frame, wherein the plurality of support links comprise at least four support links that are positioned circumferentially about a perimeter of the shell proximate an edge of the perimeter of the shell.

2. The modular reflector of claim 1, wherein the shell comprises a structure with an isotropic coefficient of thermal expansion that causes the structure to be thermally stable, wherein the shell being supported by the plurality of support links substantially eliminates radio frequency pattern distortion caused by temperature swings.

3. The modular reflector assembly of claim 1, wherein each support link comprises a structure configured to withstand launch loads of the modular reflector being launched into orbit as part of a satellite and configured to thermally decouple the support frame from the shell to substantially minimize distortion of the shell and minimize radio frequency pattern distortion during on-orbit temperature changes.

4. The modular reflector assembly of claim 3, wherein each support link comprises an isotropic laminate structure.

5. The modular reflector assembly of claim 1, wherein the plurality of support links comprises a plurality of radial-release flexures.

6. The modular reflector assembly of claim 1, wherein the shell comprises:
    a front face sheet, the front face sheet comprising the reflective surface;
    a rear face sheet; and
    a honeycomb panel disposed between the front face sheet and the rear face sheet to define a honeycomb sandwich structure.

7. The modular reflector assembly of claim 6, wherein the front face sheet and the rear face sheet each comprise a plurality plies of carbon fiber material and the honeycomb panel comprises a flame-resistant meta-aramid material.

8. The modular reflector assembly of claim 1, wherein the support frame comprises:
    a first face sheet;
    a second face sheet; and
    a honeycomb core disposed between the first face sheet and the second face sheet.

9. The modular reflector assembly of claim 8, wherein the first face sheet and the second face sheet comprise a plurality of plies of carbon fiber material and the honeycomb core comprises an aluminum honeycomb core.

10. The modular reflector assembly of claim 1, further comprising:
    an extended range reflector positioning mechanism interface attached on a face of the support frame opposite the shell; and
    a launch lock interface attached on the face of the support frame opposite the shell.

11. The modular reflector assembly of claim 1, wherein the shell comprises a particular shape based on a desired radiation pattern of the modular reflector assembly and wherein the support frame comprises a same shape independent of the particular shape of the shell.

12. An modular reflector assembly, comprising:
    a substantially circular shaped shell for reflecting radio frequency signals, the shell comprising a thermally stable structure that substantially maintains its shape with temperature changes;
    a support frame; and
    a plurality of support links that mechanically couple the shell to the support frame, wherein the shell is thermally decoupled from the support frame by the plurality of support links and the support links provide a gap between the shell and the support frame, wherein the plurality of support links comprise at least four support links that extend perpendicular from the support frame and are positioned circumferentially about a perimeter of the shell proximate an edge of the perimeter of the shell.

13. The modular reflector assembly of claim 12, wherein each support link comprises a structure configured to withstand launch loads of the modular reflector being launched into orbit as part of a satellite, and the structure is configured to thermally decouple the support frame from the shell to substantially minimize distortion of the shell and substantially minimize radio frequency pattern distortion during on-orbit temperature swings.

14. The modular reflector assembly of claim 12, wherein each support link comprises a plurality of laminated plies of composite material;
    the shell comprises:
        a front face sheet of composite material;
        a rear face sheet of composite material; and
        a honeycomb panel disposed between the front face sheet and the rear face sheet to define a honeycomb sandwich structure, the honeycomb panel comprising a material with a coefficient of thermal expansion resulting in the shell substantially maintaining its shape during temperature changes, wherein the front face sheet comprises a reflective surface; and
    the support frame comprises:
        a first face sheet of composite material;
        a second face sheet of composite material; and
        a honeycomb core disposed between the first face sheet and the second face sheet.

15. A method for making an modular reflector assembly, comprising:
    forming a substantially circular shaped shell;
    forming a support frame, the support frame comprising a same shape regardless of the particular shape of the shell; and
    mechanically coupling the shell to the support frame by a plurality of support links, wherein the shell is thermally decoupled from the support frame by the plurality of support links, the support links providing a gap between the shell and the support frame, and wherein the shell comprises a reflective surface that reflects radio frequency signals, the reflective surface being opposite another surface that faces the support frame, wherein the plurality of support links comprise at least four support links that are positioned circumferentially about a perimeter of the shell proximate an edge of the perimeter of the shell.

16. The method of claim 15, wherein forming the shell comprises forming a structure with an isotropic coefficient of thermal expansion configured to be thermally stable, the shell being thermally stable and supported by the plurality of support links substantially eliminates radio frequency pattern distortion caused by temperature changes.

17. The method of claim 16, further comprising forming the reflective surface on the shell.

18. The modular reflector assembly of claim 1, wherein the support frame defines a plane comprising a multi-sides non-rectangular oblong shape.

19. The modular reflector assembly of claim 1, wherein the plurality of support links comprise more than four support links and up to twelve support links that are evenly distributed about a perimeter of the shell.

20. The modular reflector assembly of claim 1, further comprising an opening formed through the support frame for each support link, wherein a first end of each support link extends through a respective opening in the support frame and each support link is attached to the support frame on at least one side of the support frame, and a second end of each support link is attached to the shell.

21. The modular reflector assembly of claim 20, wherein the support frame comprises a first face sheet facing the shell and a second face sheet opposite the first face sheet and the opening for each support link is formed through the first face sheet and the second face sheet, each support link extends through the opening in the first face sheet and the second face sheet and is attached to the first face sheet and the second face sheet by respective fastening mechanisms.

22. The modular reflector assembly of claim 21, wherein each fastening mechanism comprises an angle clip that is bonded to the support link and the support frame.

23. The modular reflector assembly of claim 1, wherein each of the support links are flexible in a radial direction from a center point of the substantially circular shell and the support links are positioned relative to one another so that radial lines of action of the support links intersect at the center point.

* * * * *